(12) United States Patent
He et al.

(10) Patent No.: US 7,843,519 B2
(45) Date of Patent: Nov. 30, 2010

(54) PIXEL STRUCTURE OF TFT-LCD

(75) Inventors: Xiangfei He, Beijing (CN); Wei Wang, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 114 days.

(21) Appl. No.: 12/274,494

(22) Filed: Nov. 20, 2008

(65) Prior Publication Data
US 2009/0195718 A1   Aug. 6, 2009

(30) Foreign Application Priority Data
Feb. 4, 2008   (CN) .................. 2008 1 0057694

(51) Int. Cl.
G02F 1/1343   (2006.01)
H01L 27/14   (2006.01)
(52) U.S. Cl. ........................... 349/38; 257/72
(58) Field of Classification Search .................. 349/38, 349/41, 42, 43, 56, 139; 257/72
See application file for complete search history.

(56) References Cited

U.S. PATENT DOCUMENTS

| | | | |
|---|---|---|---|
| 5,877,512 A * | 3/1999 | Kim | 257/57 |
| 6,400,436 B1 * | 6/2002 | Komatsu | 349/141 |
| 6,429,907 B1 * | 8/2002 | Park et al. | 349/38 |
| 6,580,093 B2 * | 6/2003 | Chung et al. | 257/72 |
| 6,891,588 B2 * | 5/2005 | Kawachi et al. | 349/114 |
| 6,897,908 B2 * | 5/2005 | Lee et al. | 349/43 |
| 2007/0159568 A1 * | 7/2007 | Ono et al. | 349/43 |
| 2008/0001876 A1 * | 1/2008 | Ito et al. | 345/87 |
| 2009/0115950 A1 * | 5/2009 | Toyota et al. | 349/114 |
| 2009/0195718 A1 * | 8/2009 | He et al. | 349/38 |

FOREIGN PATENT DOCUMENTS

JP   6-208130 A   7/1994

* cited by examiner

*Primary Examiner*—Brian M Healy
(74) *Attorney, Agent, or Firm*—Ladas & Parry LLP

(57) ABSTRACT

One embodiment according to the present invention provides a pixel structure of a thin film transistor liquid crystal display (TFT-LCD) array substrate comprising a pixel electrode, a gate line and a data line, the gate line and the data line intersecting with each other to define a pixel unit and forms a parasitic capacitor at an intersection point between the gate line and the date line, wherein a branch is provided on the gate line and a protective capacitor is formed between the branch and the data line and is connected in parallel to the parasitic capacitor, and the capacitance of the protective capacitor is less than that of the parasitic capacitor.

13 Claims, 6 Drawing Sheets

PIXEL STRUCTURE OF TFT-LCD

BACKGROUND

The present invention relates to a pixel structure, and in particular, to a pixel structure of an array substrate of a thin film transistor liquid crystal display (TFT-LCD).

In the current TFT-LCDs, electrostatic discharge (ESD) tends to occur at the intersection point between a gate line and a data line, resulting in a gate line-data line short defect (DGS defect).

FIG. 1A is a schematic view of a pixel structure manufactured by using a convent five-mask process, and FIG. 1B is a cross-sectional view taken along line A-A in FIG. 1A. Referring to FIG. 1A and FIG. 1B, the pixel structure comprises a pixel electrode 11, a data line 12, and a gate line 13, and the data line 12 and the gate line 13 intersect with each other to define a pixel unit. As shown in the layer structure in FIG. 1b, the data line 12 and the gate line 13 are disposed between a substrate 00 and a first protective layer (a passivation layer) 15. Through an active layer 123 at the intersection point, a parasitic capacitor is formed due to the data line 12 overlapping the gate line 13. DGS defect is prone to occur as a result of the electrostatic discharge of the parasitic capacitor.

FIG. 2A is a schematic view of a pixel structure manufactured using current four-mask process, and FIG. 2B is a cross-sectional view taken along line B-B in FIG. 2A. Referring to FIG. 2A and FIG. 2B, the pixel structure comprises a pixel electrode 22, a data line 22, and a gate line 23, and the data line 12 and the gate line 13 intersect with each other to define a pixel unit. As shown in the layer structure in FIG. 2b, the data line 22 and the gate line 23 are disposed between a substrate 00 and a second protective layer (a passivation layer) 25. Through an active layer 223 at the intersection point, a parasitic capacitor is formed due to the data line 22 overlapping the gate line 23. DGS defect is prone to occur as a result of the electrostatic discharge of the parasitic capacitor.

One of the disadvantages of the conventional pixel structure is lack of protection means for the parasitic capacitor that easily suffers from ESD, and it is difficult to repair after ESD occurs, reducing production quality and yield.

SUMMARY

One embodiment according to the present invention provides a pixel structure of a thin film transistor liquid crystal display (TFT-LCD) array substrate comprising a pixel electrode, a gate line and a data line, the gate line and the data line intersecting with each other to define a pixel unit and forms a parasitic capacitor at an intersection point between the gate line and the date line, wherein a branch is provided on the gate line and a protective capacitor is formed between the branch and the data line and is connected in parallel to the parasitic capacitor, and the capacitance of the protective capacitor is less than that of the parasitic capacitor.

According to the present invention, since a protective capacitor is provided for the pixel structure, thereby the defect rate due to ESD can be effectively reduced and the yield can be improved. Also, the manufacturing cost can be decreased especially for LCD TV products. In addition, the protection design of this structure is not complex and the display region occupied by this structure is small. Further, this structure can be realized on the basis of the present process and brings about little cost for new products.

Further scope of applicability according to the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative according to the present invention and wherein.

DETAILED DESCRIPTION OF THE PREFERRED EMBODIMENTS

First Embodiment

This embodiment provides an exemplary pixel structure of a TFT-LCD array substrate that is manufactured by using a five-mask process. The five-mask process is one of the current methods of manufacturing a pixel structure of a TFT-LCD array substrate. In this embodiment, the five-mask process is performed as blow:

1. depositing a gate metal layer on a substrate and patterning the gate metal layer to form a gate line, a branch of the gate line, and a gate electrode on the substrate through photoresist film applying, exposing, and etching processes;

2. depositing a gate insulating layer and an active layer and patterning the active layer to form an active layer pattern through photoresist film applying, exposing, and etching processes;

3. depositing a source/drain metal layer and patterning the source/drain metal layer to form a data line, a source electrode and a drain electrode through photoresist film applying, exposing, and etching processes;

4. depositing a passivation layer and patterning the passivation layer to form therein a via hole exposing the source electrode through photoresist film applying, exposing, and etching processes; and 5. depositing a pixel electrode layer and patterning the pixel electrode layer to form a pixel electrode, which is connected with the source electrode through the via hole, through photoresist film applying, exposing, and etching processes.

Figure 1A:
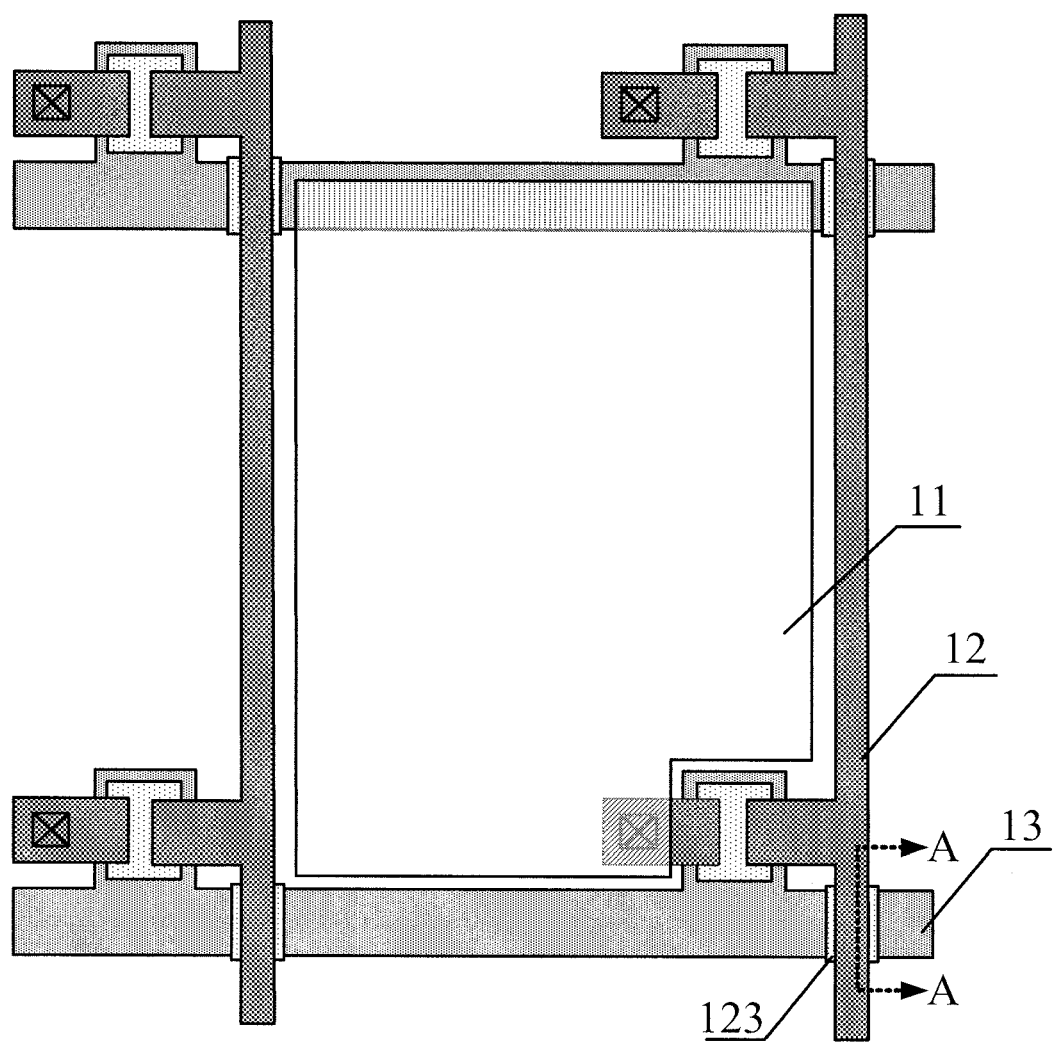
FIG. 1A is a schematic view of a pixel structure manufactured by using a current five-mask process.
Figure 1B:
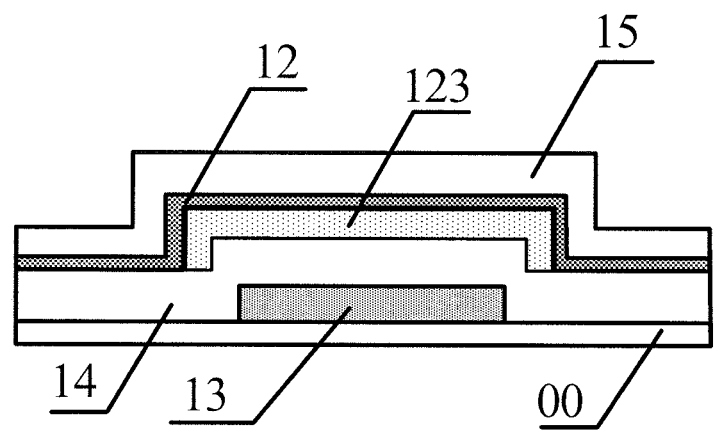
FIG. 1B is a cross-sectional view taken along line A-A in FIG. 1A.
Figure 2A:
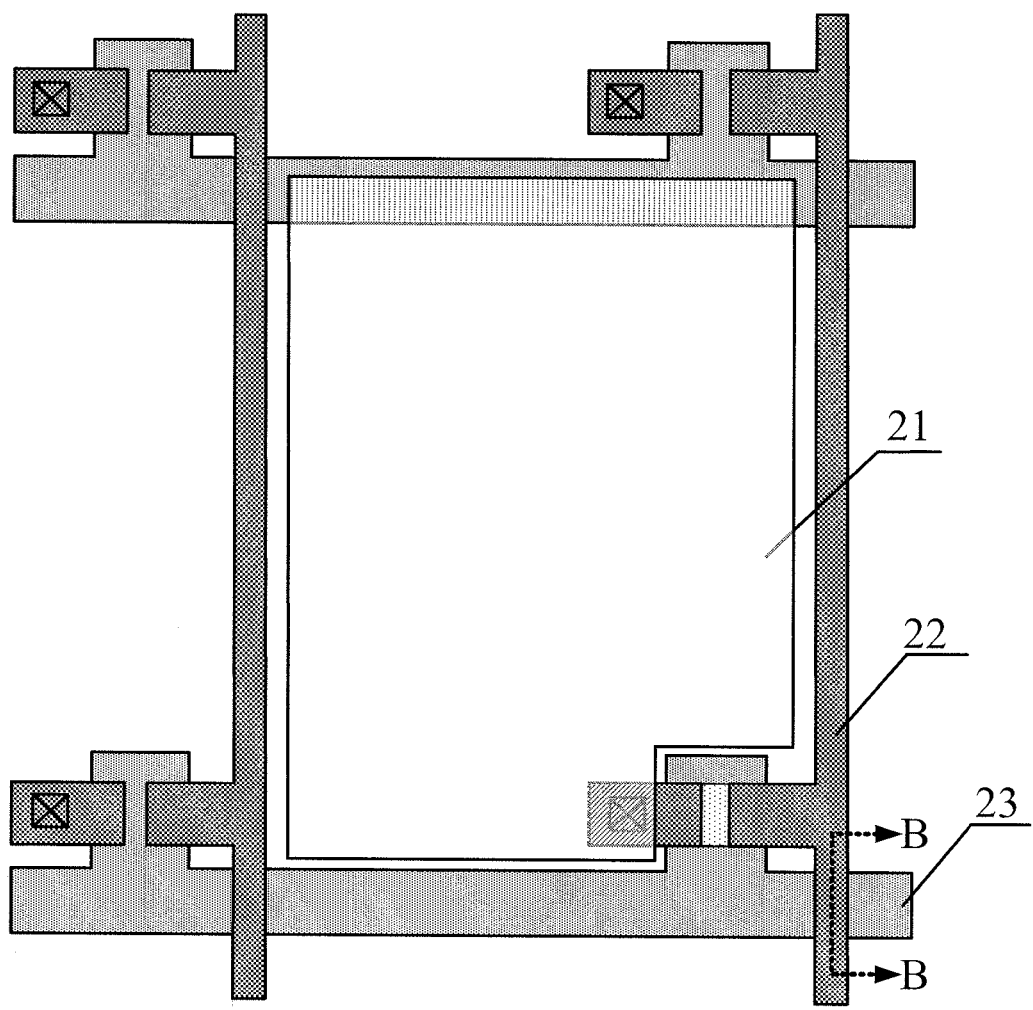
FIG. 2A is a schematic view of a pixel structure manufactured by using a current four-mask process.
Figure 2B:
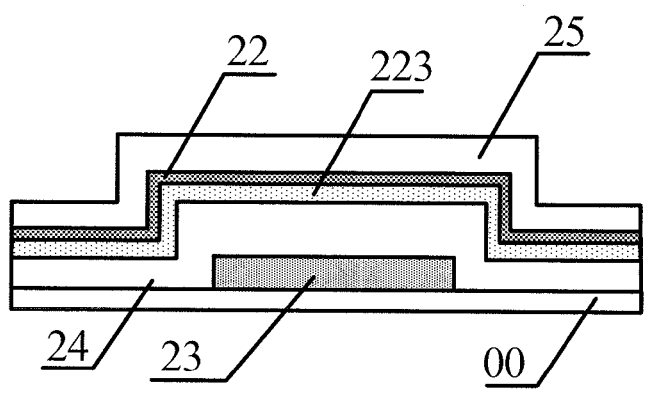
FIG. 2B is a cross-sectional view taken along line B-B in FIG. 2A.
Figure 3A:
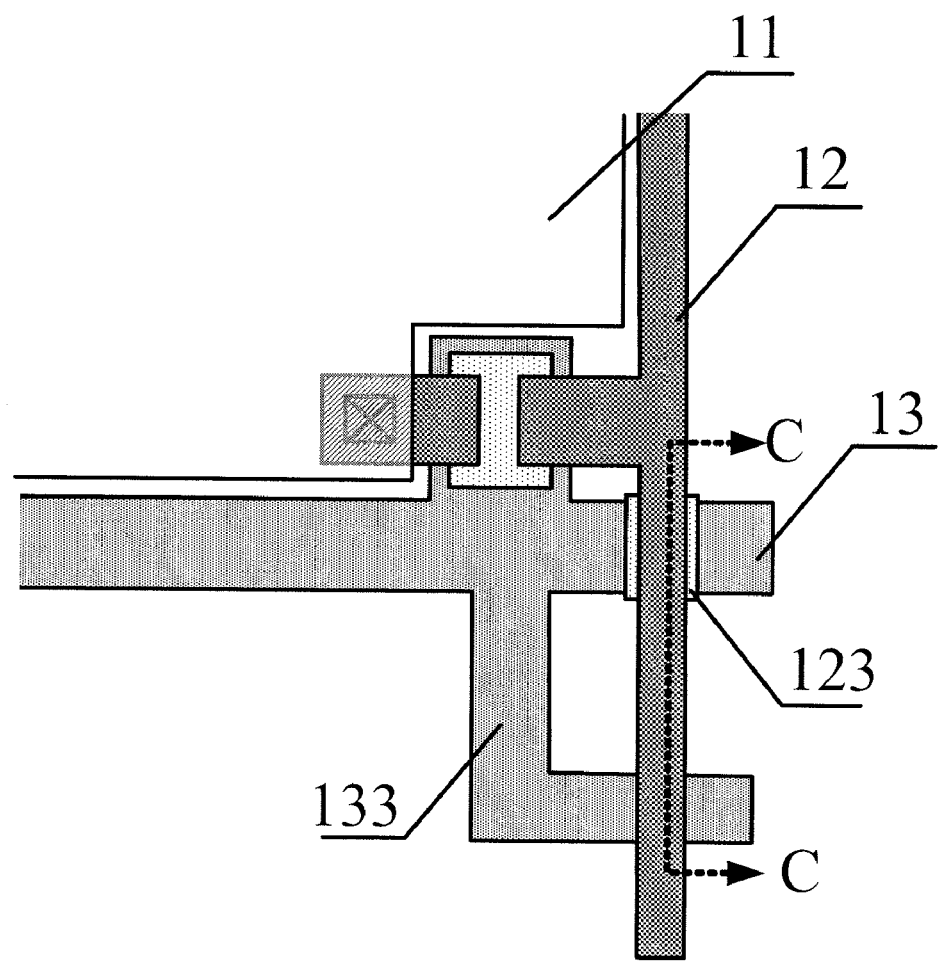
FIG. 3A is a schematic view of a pixel structure of a first embodiment according to the present invention.
Figure 3B:
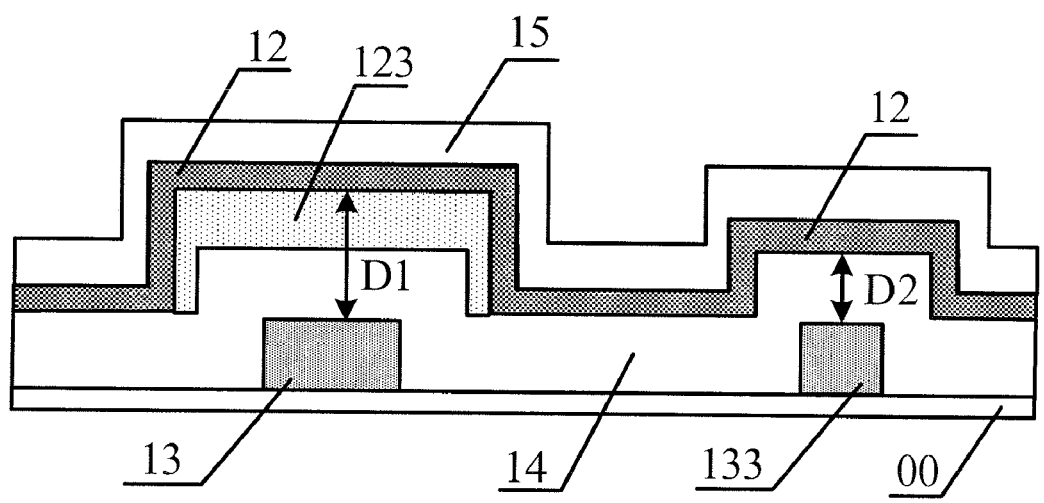
FIG. 3B is a cross-sectional view taken along line C-C in FIG. 3A.

As shown in FIG. 3A, the pixel structure of this embodiment comprises a pixel electrode 11, a data line 12 and a gate line 13. The data line 12 and the gate line 13 intersect with each other to define a pixel unit, and a parasitic capacitor is formed at the intersection point between the gate line 13 and the data line 12, as illustrated in FIG. 3B, which is a cross-sectional view taken along line C-C in FIG. 3A. An upper electrode of the parasitic capacitor is the data line 12, and a lower electrode of the parasitic capacitor is the gate line 13. The distance between the two electrodes is D1 as indicated with an arrow in FIG. 3B.

A branch 133 extends away from the gate line 13 and intersects the data line 12. A protective capacitor is formed between the branch 133 and the data line 12. The branch 133 is in the same layer as the gate line 13. The branch 133 and the gate line 13 are integrally formed, and the branch 133 and the data line 12 intersect with each other to form the protective capacitor. In this embodiment, the branch 133 and the gate line 13 are formed in the same layer and integrally formed, so the gate line 13 and branch 133 can be formed in one same photolithography process.

As shown in FIG. 3B, an upper electrode of the protective capacitor is formed by the data line 12, and a lower electrode is formed by the branch 133. The distance between the two electrodes of the protective capacitor is D2 as indicated by an arrow in FIG. 3B. From the figures, it can be seen that the distance D1 between the two electrodes of the parasitic capacitor is equal to the sum of the thickness of the first protective layer (the gate insulating layer) 14 and the thickness of the active layer 123, and the distance D2 between the two electrodes of the protective capacitor is only equal to the thickness of the first protective layer 14. Since the active layer 123 is not provided between the two electrodes of the protective capacitor, the distance D2 between the two electrodes of the protective capacitor is smaller than the distance D1 between the two electrodes of the parasitic capacitor, and the capacitance of the protective capacitor is smaller than that of the parasitic capacitor.

Figure 3C:
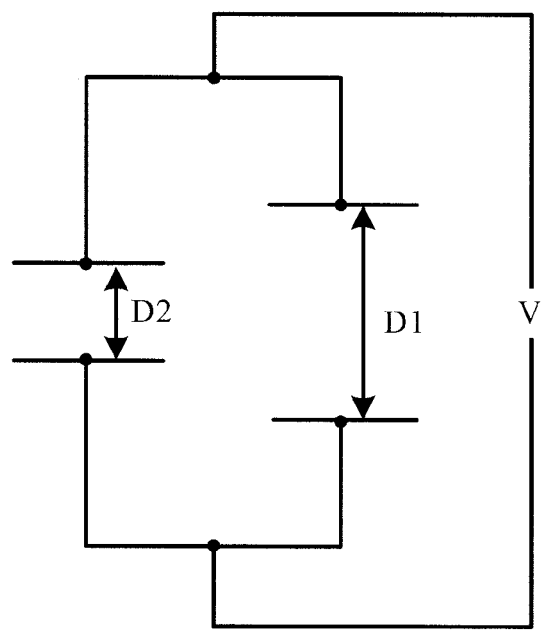
FIG. 3C is an equivalent circuit diagram of a protective capacitor and a parasitic capacitor of the first embodiment according to the present invention.

FIG. 3C is an equivalent circuit diagram for the protective capacitor and the parasitic capacitor. As shown in FIG. 3C, the protective capacitor is connected in parallel to the parasitic capacitor, thus the voltages across the two capacitances are equal to each other. Under the equation: $E=F/D$, wherein E is electric field intensity, F is voltage, and D is distance between the two electrodes of a capacitor, when the dielectric medium between the two electrodes is the same in the two capacitors, electric field intensity E increases with the decrease of the distance D between the two electrodes, and if the electric field intensity E is high, the breakdown of capacitance tends to occur. Thus, in the embodiment, if electrostatic exists on the gate line 13 or the data line 12, the protective capacitor is easier to suffer from breakdown than the parasitic capacitor because the capacitance of the protective capacitor is smaller than that of the parasitic capacitor. Once ESD occurs, breakdown of the protective capacitor first occurs, thereby the electrostatic can be discharged and the parasitic capacitor can be protected and kept normally. After the protective capacitor breakdown, the pixel unit can be repaired by laser cutting the branch 133 to have the branch 133 separated from the gate line 13, thus the pixel unit can normally operate.

Figure 3D:
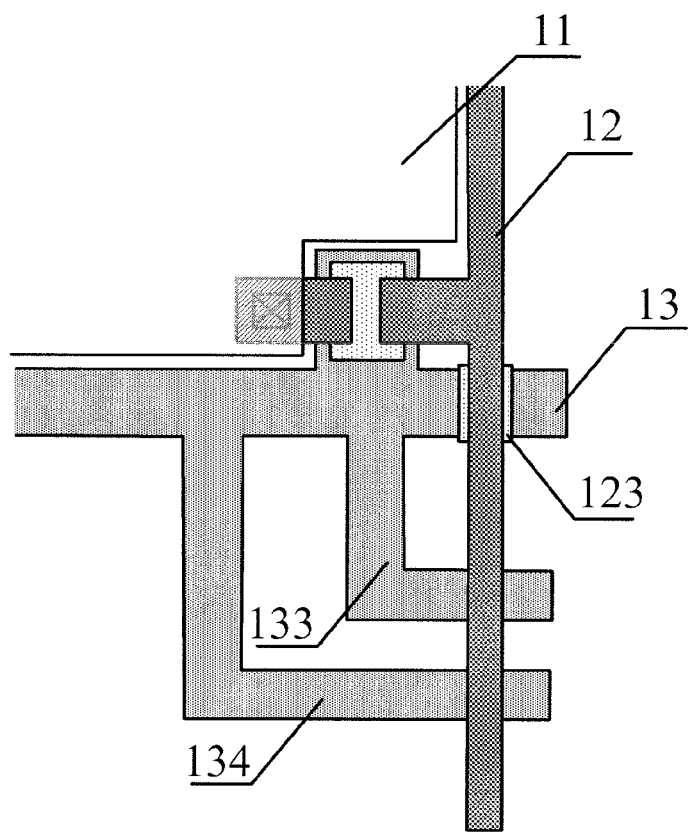
FIG. 3D is a schematic view of a pixel structure having two protective capacitors of the first embodiment according to the present invention.

Furthermore, more than one protective capacitor can be provided. As shown in FIG. 3D, two branches 133 and 144 are formed and intersect with the data line 12, respectively, to form two protective capacitors that are connected in parallel to the parasitic capacitor. Similarly, more branches may be provided in substantially the same manner as the case of two branches, the description is omitted here for the purpose of simplicity.

Furthermore, the capacitance of the capacitors can be controlled in a reasonable range by appropriately selecting film thickness, area, dielectric constant of the medium and so on, so as to prevent the breakdown of the protective capacitor from occurring frequently due to a small capacitance and to avoid thus increased repairing cost. In addition, a multi-level protection can be realized for the pixel structure by forming the different protective capacitors of different capacitances.

With the pixel structure in this embodiment, the protective capacitor is provided for the pixel structure manufactured by using the five-mask process. Thus the defect rate due to ESD may be effectively reduced, yield can be increased, and the cost can be decreased, especially for LCD TV products. In addition, the protect design of the pixel structure of the embodiment is simple, occupies a relatively small display region, and can be realized on the basis of the current manufacture process and does not increased cost.

Second Embodiment

This embodiment provides another exemplary pixel structure of a TFT-LCD array substrate that is manufactured by using a four-mask process. The four-mask process is also one of the current methods of manufacturing a pixel structure of a TFT-LCD array substrate. In this embodiment, the four-mask process is performed as blow:

1. depositing a gate metal layer on a substrate and patterning the gate metal layer to form a gate line, an extension portion of the gate line, and a gate electrode on the substrate through photoresist film applying, exposing, and etching processes;

2. depositing a gate insulating layer, an active layer, and a source/drain metal layer and patterning the active layer and the source/drain metal layer to form an active layer pattern, a data line, a source electrode and a drain electrode by photoresist film applying, exposing with a half tone mask or a gray tone mask, and two etching processes;

3. depositing a passivation layer and patterning the passivation layer to form therein a via hole exposing the source electrode and a via hole exposing the extension portion of the gate line through photoresist film applying, exposing, and etching processes; and 4. depositing a pixel electrode layer and patterning the pixel electrode layer to form a pixel electrode, which is connected with the source electrode through the via hole exposing the source electrode, and a lead portion, which is connected to the extension portion though the via hole exposing the extension portion, through photoresist film applying, exposing, and etching processes.

Figure 4A:
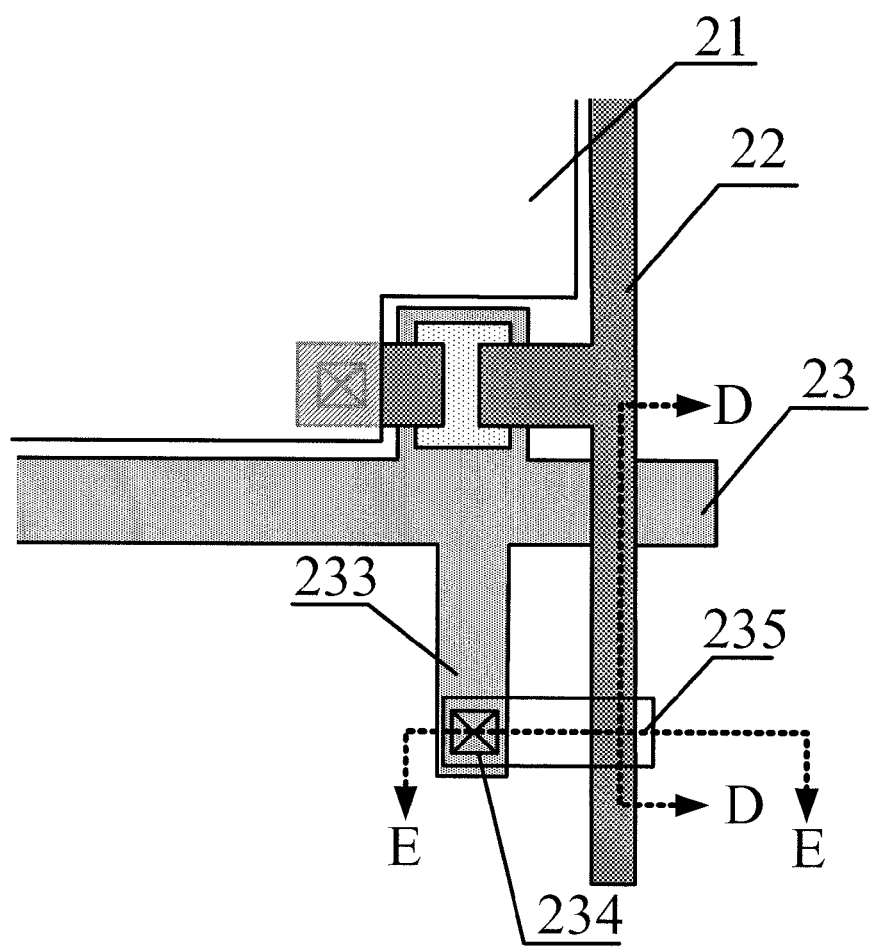
FIG. 4A is a schematic view of a pixel structure of a second embodiment according to the present invention.
Figure 4B:
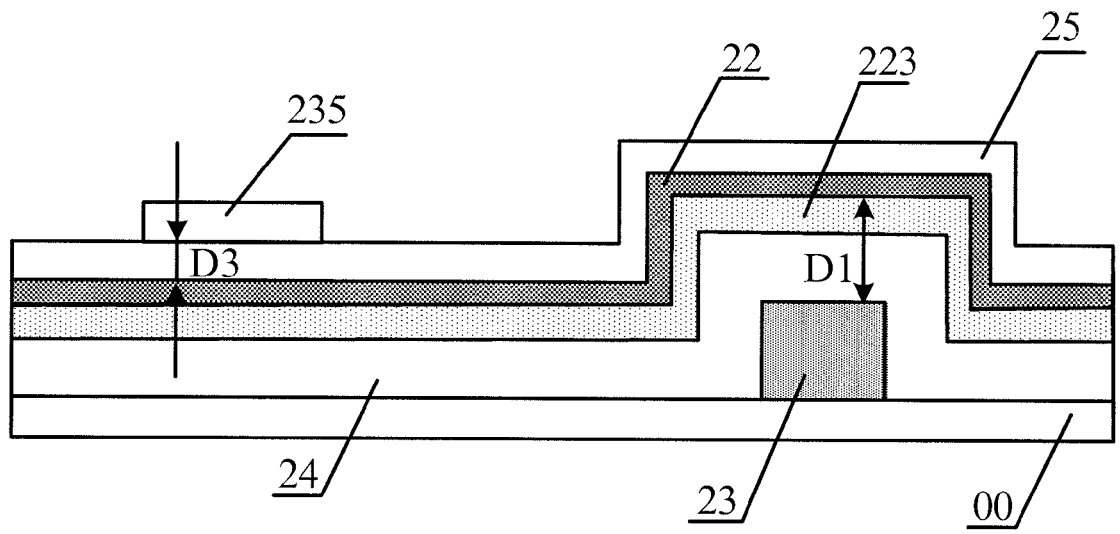
FIG. 4B is a cross-sectional view taken along line D-D in FIG. 4A.

As shown in FIG. 4A, the pixel structure of this embodiment comprises a pixel electrode 21, a data line 22 and a gate line 23. The data line 22 and the gate line 23 intersect with each other to define a pixel unit, and a parasitic capacitor is formed at the intersection point between the gate line 23 and the data line 22, as illustrated in FIG. 4B, which is a cross-sectional view taken along line D-D in FIG. 4A. An upper electrode of the parasitic capacitor is the data line 22, and a lower electrode of the parasitic capacitor is the gate line 23. The distance between the two electrodes of the parasitic capacitor is D1 as indicated with an arrow in FIG. 4B.

In this embodiment, the pixel structure is manufactured by using a four-mask process, and as shown in FIG. 4B, in this process, since an active layer 223 is not only provided in the region corresponding to the gate line 23 but also extends along the data line 22. In this case, the branch 133 in the above first embodiment that is formed integrally with the gate line 13 cannot work any more because the distance between the two electrodes of the protective capacitor formed between the branch and the data line is not less than the distance between the two electrodes of the parasitic capacitor and the capacitance of thus formed protective capacitor is not smaller than that of the parasitic capacitor, that is, the purpose of protecting the parasitic capacitor can not be obtained.

Figure 4C:
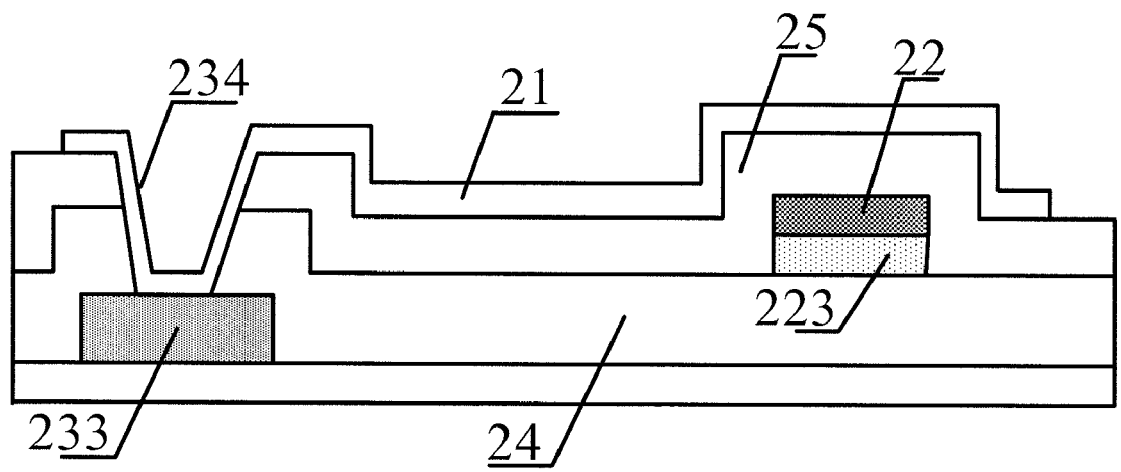
FIG. 4C is a cross-sectional view taken along line E-E in FIG. 4A.

To cope with the above problem, the branch is modified in the second embodiment and comprises an extension portion 233 and a lead portion 235. One end of the extension portion 233 is connected to the gate line 23, and the other end of the extension portion 233 is connected to the lead portion 235. The lead portion 235 intersects the data line 23 to form the protective capacitor. Specifically, as shown in FIG. 4C, the material of the lead portion 235 is the same as that of the pixel electrode 21 and is electrically connected to the extension portion 233 through a via hole 234 in the passivation layer. The lead portion 235 is not provided in the same layer as the gate line 23 but as the pixel electrode 21. Therefore, the lead portion 235 can be formed in one same photolithography process as the pixel electrode 21.

As shown in FIG. 4B, the distance D1 between the two electrodes of the parasitic capacitor is equal to the sum of the thickness of the first protective layer (the gate insulating layer) 24 and that of the active layer 223, and the distance D3 between the two electrodes of the protective capacitor is equal to the thickness of the second protective layer 25 only. It is easy to have the distance D3 between the two electrodes of the protective capacitor smaller than the distance D1 between the two electrodes of the parasitic capacitor by controlling the thickness of the layers to form the layer structure.

Similar to the case as shown in FIG. 3C, the protective capacitor in this embodiment is also connected in parallel to the parasitic capacitor. With the decrease of distance D between the two electrodes, the electric field intensity E increases and the breakdown of the capacitance become easier to occur. Therefore, when the electrostatic discharge occurs, the protective capacitor of smaller capacitance is easy to subject to breakdown and can protect the parasitic capacitor of bigger capacitance.

Figure 4D:
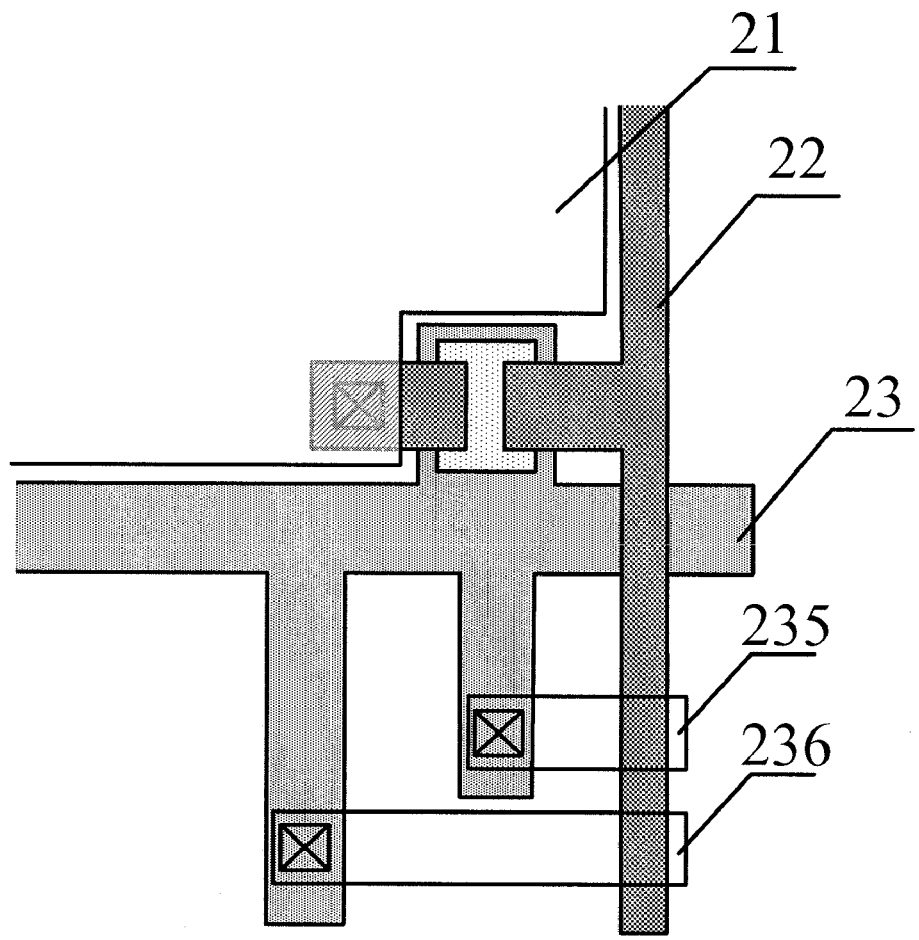
FIG. 4D is a schematic view of a pixel structure having two protective capacitors of the first embodiment according to the present invention.

Also, more than one protective capacitor can be formed in the present embodiment. As shown in FIG. 4D, two lead portions 235 and 236 that are connected with extension portions of the gate line 23 intersect the date line 22 respectively to form two protective capacitors that are connected in parallel to the parasitic capacitor. The extension portion can be only one. In addition, the capacitance value can be controlled in a reasonable range by appropriately selecting film thickness, area, dielectric constant of the medium and so on, so as to prevent the breakdown of the protective capacitor from occurring frequently due to a small capacitance and to avoid thus increased repairing cost. In addition, a multi-level protection can be realized for the pixel structure by forming the different protective capacitors of different capacitances.

With the pixel structure in this embodiment, the protective capacitor is provided for the pixel structure manufactured by using the four-mask process. Thus the defect rate due to ESD may be effectively reduced, yield can be increased, and the cost can be decreased, especially for the LCD TV products. In addition, the protection design of the pixel structure is simple, occupies the relatively small display region, and can be realized on the basis of the current manufacture process and does not increased cost.

The embodiments of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A pixel structure of a thin film transistor liquid crystal display (TFT-LCD) array substrate comprising a pixel electrode, a gate line and a data line, the gate line and the data line intersecting with each other to define a pixel unit and forms a parasitic capacitor at an intersection point between the gate line and the date line,
   wherein a branch is provided on the gate line and a protective capacitor is formed between the branch and the data line and is connected in parallel to the parasitic capacitor, and the capacitance of the protective capacitor is less than that of the parasitic capacitor.

2. The pixel structure according to claim 1, wherein the branch is in the same layer as the gate line and integrally formed with the gate line, and the branch intersect the data line to form the protective capacitor.

3. The pixel structure according to claim 2, wherein a distance between the branch and the data line as two electrodes of the protective capacitor is less than that between the gate line and the data line as two electrodes of the parasitic capacitor.

4. The pixel structure according to claim 3, wherein the two electrodes of the protective capacitor are separated through a gate insulating layer, and the two electrodes of the parasitic capacitor are separated through the gate insulating layer and an active layer.

5. The pixel structure according to claim 3, wherein a plurality of branches are provided on the gate line, and the plurality of branches form a plurality of protective capacitor with the data line, respectively.

6. The pixel structure according to claim 1, wherein the branch comprises an extension portion and a lead portion, one end of the extension portion is integrally connected to the gate line and the other end of the extension portion is electrically connected to the lead portion, and the lead portion intersects the data line to form the protective capacitor.

7. The pixel structure according to claim 6, wherein a distance between the lead portion and the data line as two electrodes of the protective capacitor is less than that between the gate line and the data line as two electrodes of the parasitic capacitor.

8. The pixel structure according to claim 7, wherein the two electrodes of the protective capacitor are separated through a passivation layer, and the two electrodes of the parasitic capacitor are separated through a gate insulating layer and an active layer.

9. The pixel structure according to claim 6, wherein the lead portion is formed of a same material as that of the pixel electrode.

10. The pixel structure according to claim 9, wherein the lead portion is electrically connected to the gate line through a via hole.

11. The pixel structure according to claim 10, wherein the lead portion is in a same layer as the pixel electrode.

12. The pixel structure according to claim 6, wherein a plurality of branches are provided on the gate line, and the plurality of branches form a plurality of protective capacitor with the data line, respectively.

13. The pixel structure according to claim 1, wherein a plurality of protective capacitors are provided and are connected in parallel with the parasitic capacitor.

\* \* \* \* \*